(12) United States Patent
Falconer

(10) Patent No.: US 11,518,115 B2
(45) Date of Patent: Dec. 6, 2022

(54) THERMOPLASTIC FORMING TOOL

(71) Applicant: ThermaLoop, Carrollton, TX (US)

(72) Inventor: Charlie Falconer, Carrollton, TX (US)

(73) Assignee: THERMALOOP, Carrollton, TX (US)

( * ) Notice: Subject to any disclaimer, the term of this patent is extended or adjusted under 35 U.S.C. 154(b) by 0 days.

(21) Appl. No.: 17/037,147

(22) Filed: Sep. 29, 2020

(65) Prior Publication Data

US 2022/0097314 A1 Mar. 31, 2022

(51) Int. Cl.
| | |
|---|---|
| *B29C 51/18* | (2006.01) |
| *B29C 67/00* | (2017.01) |
| *B29C 51/42* | (2006.01) |
| *B29C 51/46* | (2006.01) |
| *B29L 31/30* | (2006.01) |
| *B29C 65/00* | (2006.01) |

(52) U.S. Cl.
CPC .......... *B29C 67/0048* (2013.01); *B29C 51/18* (2013.01); *B29C 51/421* (2013.01); *B29C 51/46* (2013.01); *B29C 66/861* (2013.01); *B29L 2031/3041* (2013.01)

(58) Field of Classification Search
CPC ....... B29C 51/18; B29C 51/421; B29C 51/46; B29C 66/861
See application file for complete search history.

(56) References Cited

U.S. PATENT DOCUMENTS

| | | | | |
|---|---|---|---|---|
| 6,116,722 | A * | 9/2000 | Sato | B41J 2/17506 347/85 |
| 6,374,893 | B1 * | 4/2002 | Behl | B29C 66/836 156/499 |
| 2012/0101417 | A1 * | 4/2012 | Joseph | A61F 5/0118 602/5 |
| 2016/0288424 | A1 * | 10/2016 | Susnjara | B29C 64/393 |
| 2017/0368771 | A1 * | 12/2017 | Harrier | B29C 73/04 |
| 2020/0055230 | A1 * | 2/2020 | Shih | B29C 51/18 |

* cited by examiner

*Primary Examiner* — Jeffrey M Wollschlager
*Assistant Examiner* — Debjani Roy
(74) *Attorney, Agent, or Firm* — Kowert, Hood, Munyon, Rankin & Goetzel, P.C.; Gareth M. Sampson

(57) ABSTRACT

A thermoplastic forming tool includes a wand that includes a handle, a tip, and a conduit coupling the handle to the tip. The tip includes a heating element, a forming shoe, and a forming shoe support. During use, heat from the heating element heats the forming shoe to a temperature at or above the glass transition temperature of a thermoplastic polymer. The thermoplastic forming tool may be used to apply a thermoplastic material to a surface.

18 Claims, 15 Drawing Sheets

THERMOPLASTIC FORMING TOOL

BACKGROUND OF THE INVENTION

1. Field of the Invention

The invention generally relates to thermoplastic forming tools that use heat to melt a thermoplastic material.

2. Description of the Relevant Art

Many types of vehicle bodies are formed from a plurality of panels that are connected to an underlying frame to form the outer surface of the vehicle. The panels are typically connected to the underlying frame using multiple bolts. To improve the aerodynamic surface of the vehicle, the bolts are typically countersunk so that the head of the bolt is below the surface of the panel.

To further improve the aerodynamic surface of a vehicle, a plug may be placed into the countersunk hole to fill the hole up to the surface of the panel. In some embodiments, the countersunk hole is filled with a thermoplastic material by softening or melting the material and shaping the material to match the surface. A thermoplastic shaping tool can be used to shape the thermoplastic material to plug the countersunk hole. Such a tool typically includes a heated wand which has a tip that is at a temperature that is at or above the glass transition temperature, or the melting point, of the thermoplastic material. Such devices suffer from numerous safety issues, particularly when the devices need to be moved to different areas of a vehicle. It is therefore desirable to provide a thermoplastic forming tool which is portable and safe to use.

SUMMARY OF THE INVENTION

In an embodiment, a thermoplastic forming tool comprises: a wand which includes a handle, a tip, and a conduit coupling the handle to the tip. The tip includes a heating element, a forming shoe, and a forming shoe support. The forming shoe is removably connected to the forming shoe support. During use heat from the heating element heats the forming shoe to a temperature at or above the glass transition temperature of a thermoplastic polymer. The thermoplastic forming tool also includes a controller. The controller includes a body. The body of the controller includes a first compartment and a second compartment. The first compartment includes a processor and the second compartment is configured to hold at least a portion of the wand during use. The processor is operable to execute program instructions. The program instructions are operable to: determine the temperature of the heating element; and adjust an electrical current provided from a power source to the heating element to adjust the temperature of the heating element.

The body of the controller includes a coupling element that allows the controller to be coupled to an article of clothing or a belt of a user of the thermoplastic forming tool.

In an embodiment, the forming shoe support comprises an alignment feature that has a shape and size that is complementary to an alignment opening of the forming shoe, or the forming shoe support comprises an alignment opening that has a shape and size that is complementary to an alignment feature of the forming shoe. When the forming shoe is connected to the forming shoe support, the alignment feature mates with the alignment opening such that the rotation of the forming shoe about the forming shoe support is inhibited.

In an embodiment, the conduit comprises one or more vent openings formed through the conduit.

In an embodiment, the forming shoe is a rounded block having a width greater than the conduit.

In an embodiment, the second compartment includes a tip support and a wand retention bracket. During use, the tip of the wand is placed on the tip support and the conduit is placed on the wand retention bracket. In an embodiment, the wand retention bracket includes a slot sized to receive the conduit. During use the conduit resides in the slot when the tip is placed on the tip support. In an embodiment, the wand retention bracket includes an elastic plate that forces the conduit against a retention wall. The first compartment may be sealed and the second compartment may be open. The second compartment may include one or more vent openings.

During use, the controller is set to a preset temperature. The controller provides sufficient electrical current to the heating element to heat the heating element to the preset temperature. In some embodiments, the preset temperature is a temperature of 400° F. or greater. In an embodiment, the preset temperature is set by coupling the controller to a computer having software that allows a user to adjust the preset temperature.

In an embodiment, a method of applying a thermoplastic material to a surface using a thermoplastic tool, as described herein, includes: heating the forming shoe to a temperature at or above the glass transition temperature of the thermoplastic polymer; placing the forming shoe against the thermoplastic material to alter the shape of the thermoplastic material to fit into an opening on the surface; and placing the heated tip of the wand into the body of the controller.

In another embodiment, a thermoplastic forming tool includes a wand comprising a handle, a tip, and a conduit coupling the handle to the tip. The tip includes a heating element, a forming shoe, and a forming shoe support. The forming shoe may be removably connected to the forming shoe support. During use, heat from the heating element heats the forming shoe to a temperature at or above the glass transition temperature of a thermoplastic polymer. The thermoplastic forming tool also includes a controller. The controller includes a body. The body of the controller includes a first compartment and a second compartment. The first compartment includes a processor. The second compartment is configured to hold at least a portion of the wand during use. The first compartment includes a thermostat coupled to the processor. The thermostat measures the temperature inside the first compartment and disconnects the supply of electrical current to the heating element when the temperature inside the first compartment is above a predetermined compartment high temperature. The processor is operable to execute program instructions. The program instructions are operable to: determine the temperature of the heating element; and adjust an electrical current provided from a power source to the heating element to adjust the temperature of the heating element. The thermostat measures the temperature inside the first compartment and disconnects the supply of electrical current to the heating element when the temperature inside the first compartment is above a predetermined compartment high temperature.

In some embodiments, the thermostat is further operable to restart the electrical current provided to the heating element when the temperature inside the first compartment drops below a predetermined compartment low temperature. The thermostat is further operable to restart the electrical current provided to the heating element when the wand is in the second compartment and the temperature in the first compartment is below the predetermined compartment low temperature.

In an embodiment, a method of applying a thermoplastic material to a surface using a thermoplastic tool, as described herein, includes: heating the forming shoe to a temperature at or above the glass transition temperature of the thermoplastic polymer; placing the forming shoe against the thermoplastic material to alter the shape of the thermoplastic material to fit into an opening on the surface. The method further includes: placing the wand into the second compartment of the body; monitoring the temperature of the second compartment; and adjusting the current supplied to the heating element based on the temperature in the second compartment.

In another embodiment, a thermoplastic forming tool includes a wand including a handle, a tip, and a conduit coupling the handle to the tip. The tip includes a heating element, a forming shoe, and a forming shoe support. The forming shoe being removably connected to the forming shoe support. During use, heat from the heating element heats the forming shoe to a temperature at or above the glass transition temperature of a thermoplastic polymer. The controller includes a processor that is operable to execute program instructions. The program instructions are operable to: determine the temperature of the heating element; and adjust an electrical current provided from the power source to the heating element to adjust the temperature of the heating element. The thermoplastic forming tool further comprises a primary temperature sensor coupled to the heating element and the controller; and a secondary temperature sensor coupled to the heating element and the controller. The controller is set to a preset temperature. The controller provides sufficient electrical current to the heating element to heat the heating element to a preset temperature. In some embodiments, the preset temperature is a temperature of 400° F. or greater. The preset temperature may be set by coupling the controller to a computer having software that allows a user to adjust the preset temperature.

In an embodiment, the controller determines the temperature of the heating element with the primary temperature sensor and the secondary temperature sensor. The controller discontinues the provided electrical current if the temperature measured by the secondary temperature sensor exceeds a temperature limit that is greater than the preset temperature.

In an embodiment, a method of applying a thermoplastic material to a surface using a thermoplastic tool, as described herein, includes: heating the forming shoe to a temperature at or above the glass transition temperature of the thermoplastic polymer. The method further includes: measuring the temperature of the heating element with the primary temperature sensor and the secondary temperature sensor; determining if the heating element is at or above the preset temperature using the primary temperature sensor; determining if the heating element is above a preset temperature limit using the secondary temperature sensor; discontinuing the electrical current to the heating element if the temperature measured by the secondary temperature sensor is at or exceeds the temperature limit. The temperature limit is greater than the preset temperature.

In another embodiment, a thermoplastic forming tool includes a wand. The wand includes a handle, a tip, and a conduit coupling the handle to the tip. The tip includes a heating element, a forming shoe, and a forming shoe support. The forming shoe is removably connected to the forming shoe support. The wand further includes a support coupled to the handle. During use, heat from the heating element heats the forming shoe to a temperature at or above the glass transition temperature of a thermoplastic polymer. The controller includes a body and a processor, wherein the processor is operable to execute program instructions. The program instructions are operable to: determine the temperature of the heating element; and adjust an electrical current provided from a power source to the heating element to adjust the temperature of the heating element. The support inhibits the forming shoe from contacting a surface when the thermoplastic forming tool is placed on the surface. In an embodiment, the support comprises a flange connected to the handle. The flange has a sufficient size to inhibit the forming shoe from contacting the surface. In an embodiment, the support comprises a substantially flat edge which is configured to rest against the surface. The flat edge, in contact with the surface, inhibits rotation of the tool when resting against the surface.

In an embodiment, a method of applying a thermoplastic material to a surface using a thermoplastic tool, as described herein, includes: heating the forming shoe to a temperature at or above the glass transition temperature of the thermoplastic polymer. The method further includes placing the wand onto the surface such that the wand support positions the forming shoe away from the surface.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
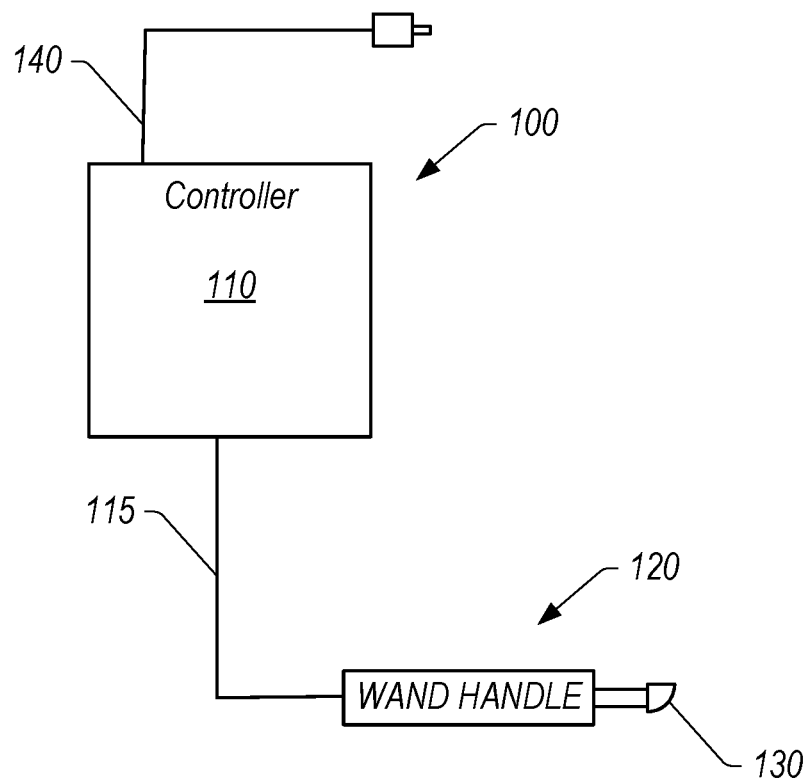
FIG. 1 depicts a general schematic diagram of a thermoplastic forming tool.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The specific embodiments disclosed herein are included to demonstrate preferred embodiments of the invention. It should be appreciated by those of skill in the art that the embodiments disclosed in the examples which follow represent embodiments discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

FIG. 1 depicts a general schematic diagram of a thermoplastic forming tool 100. The tool 100 includes a controller 110 and a wand 120. Wand 120 is coupled to controller 110 via a cable 115. Cable 115 transmits an electric current to a heating element located in tip 130 of the wand, and returns the temperature sensor signals to controller 100. The heating element is used to heat a forming shoe positioned in tip 130. The forming shoe is heated to a temperature sufficient to allow a thermoplastic material to be at least partially softened when in contact with the forming shoe. Softening or melting the thermoplastic material allows the shape of the thermoplastic material to be altered. In most cases, the forming shoe is heated to a temperature at or above the glass transition temperature of the thermoplastic material. In some embodiments, the forming shoe is heated to a temperature at or above the melting point of the thermoplastic material.

Controller 110 is coupled to a power source (not shown) through power cable 140. Power cable 140 may be coupled to a wall outlet or a battery power source. While power cable 140 is depicted as being external to the controller, if the power source is a battery power source, the cable and power source may be placed inside controller 110. Alternatively, if the power source is a battery power source, the battery may be a portable external battery that is carried by the user, along with the thermoplastic forming tool.

Figure 2:
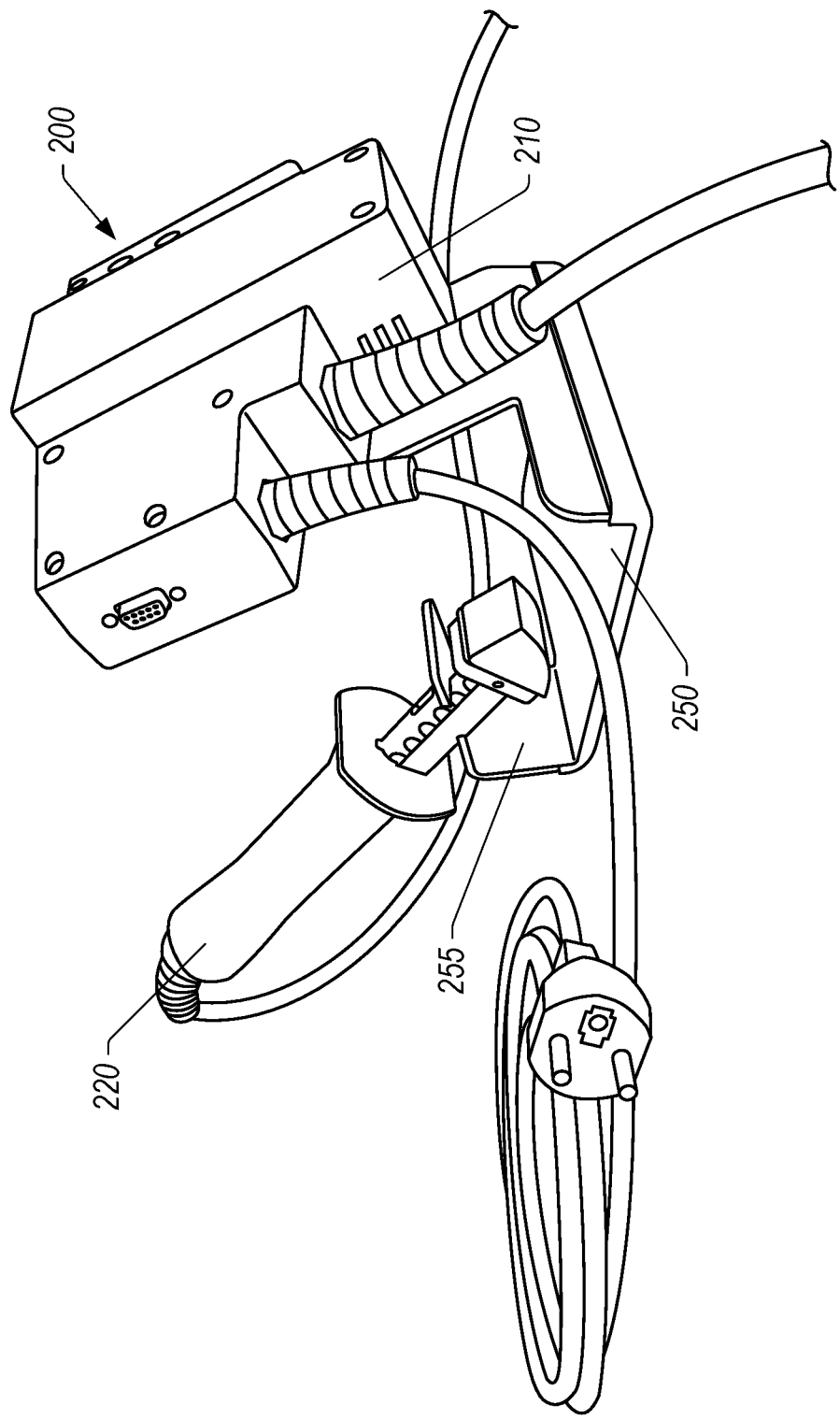
FIG. 2 depicts a front view of a thermoplastic forming tool.
Figure 3A:
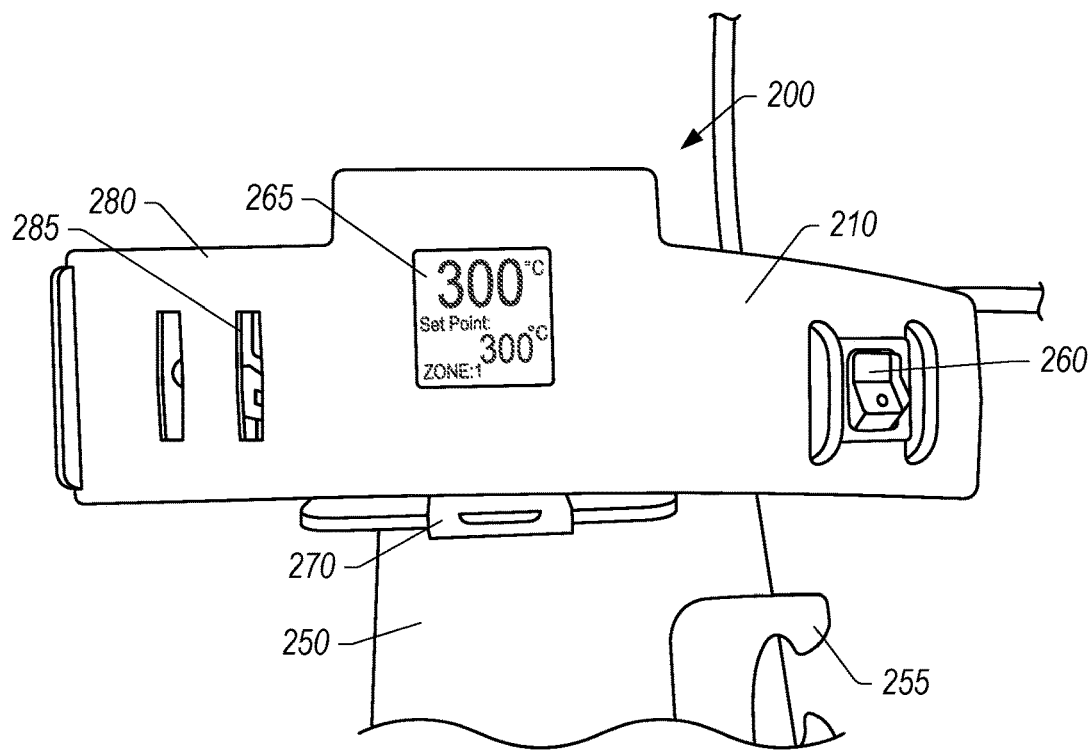
FIG. 3A depicts a top view of a thermoplastic forming tool.
Figure 3B:
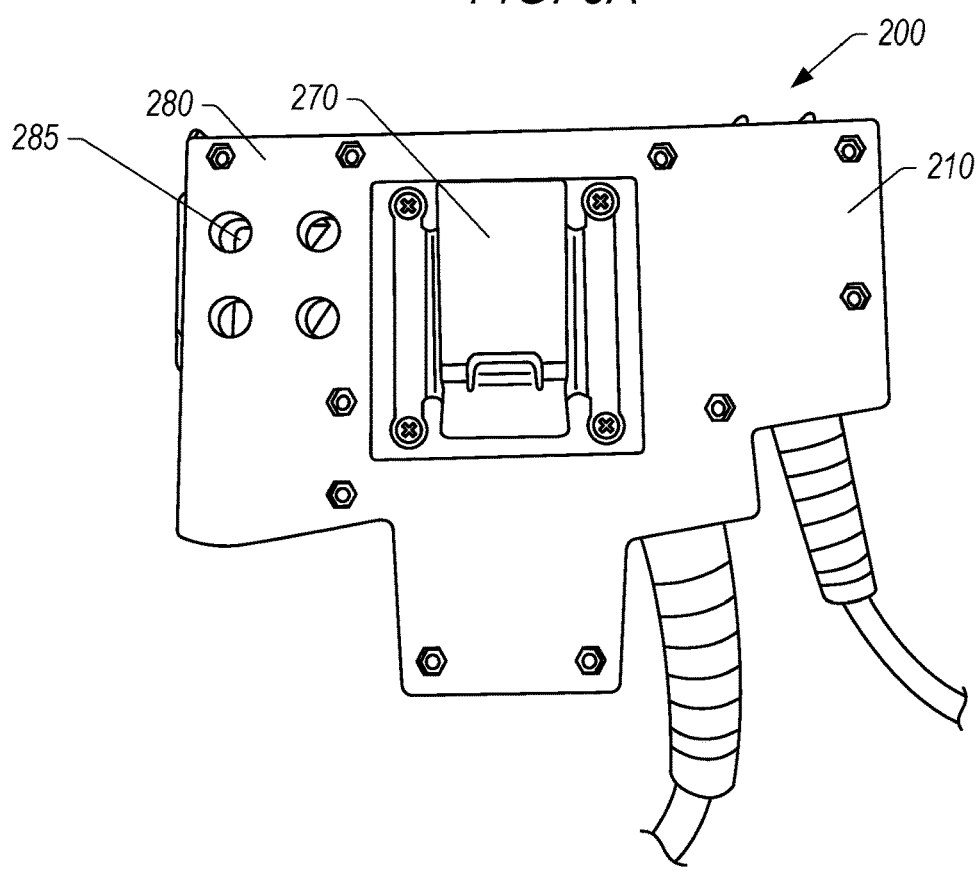
FIG. 3B depicts a back view of a thermoplastic forming tool.
Figure 4B:
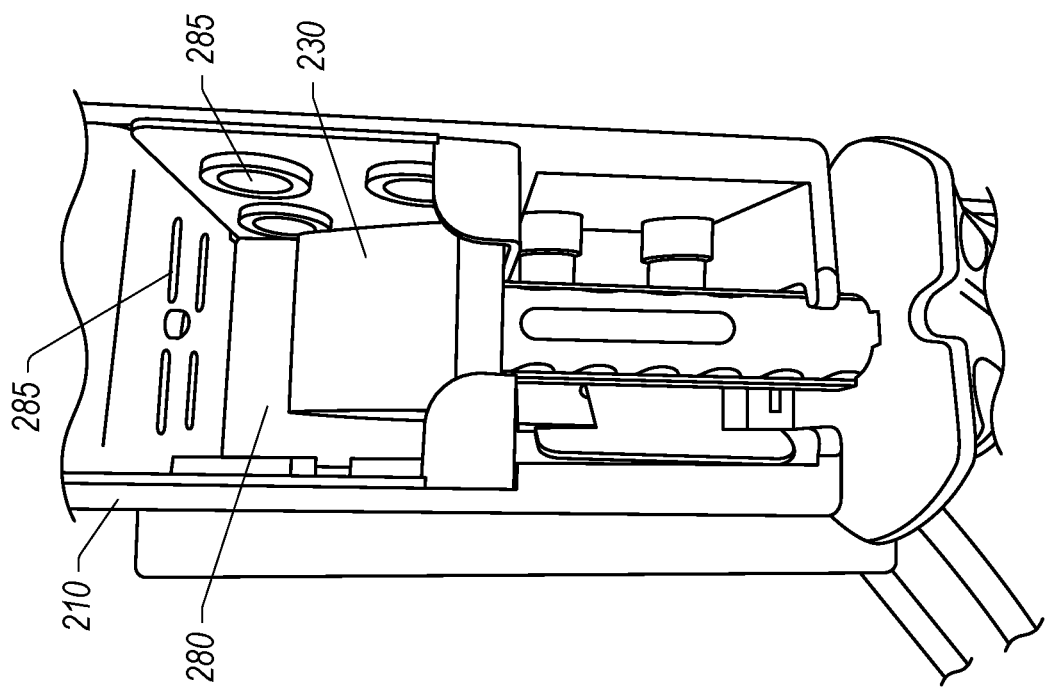
FIG. 4B depicts a side view of a thermoplastic forming tool with the wand attached.
Figure 4A:
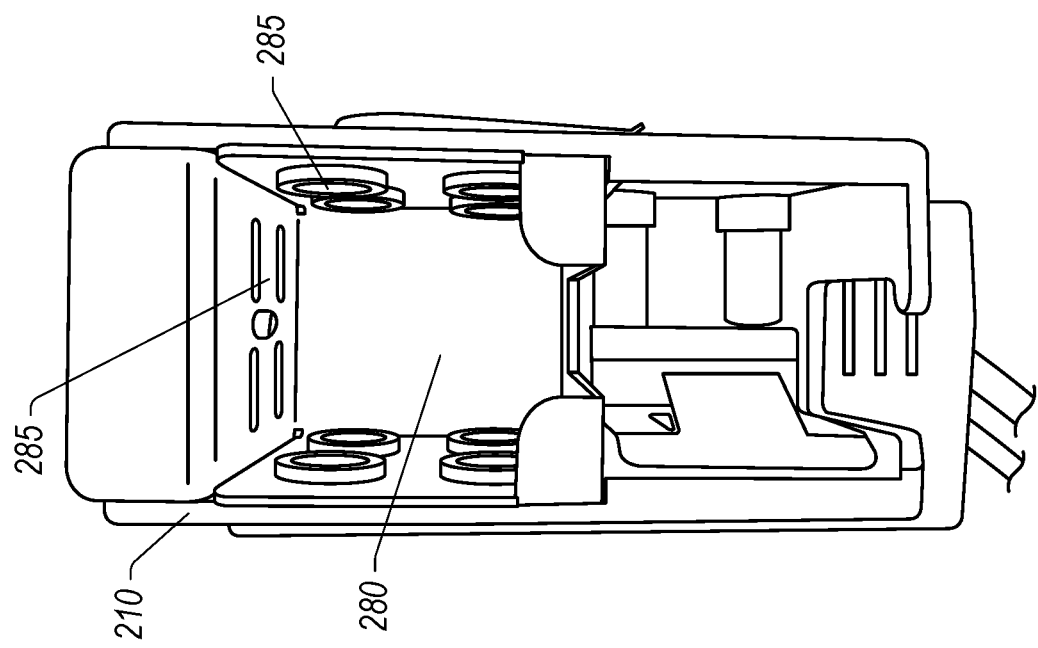
FIG. 4A depicts a side view of a thermoplastic forming tool with the wand detached.

FIGS. 2-4 depict various views of an embodiment of a thermoplastic forming tool 200. These figures show a thermoplastic forming tool 200 that is coupled to a stand 250. Stand 250 includes a wand clip 255 which holds the wand when not in use. A coupling element 270 (e.g., a clip) is used to attach the controller body to the stand (See FIGS. 3A and 3B). The same coupling elements 270 may also be used to couple the controller body to an article of clothing or a belt of the user. A power button 260 and a display 265 are mounted on the top surface of the thermoplastic forming tool. The display may provide the preset operating temperature and/or the current temperature of the tip of the wand. Placing the display and power buttons on the top surface offers an advantage for a user that is carrying the thermoplastic forming tool on their belt or on their clothing. During use, the user will only need to look down at the tool display 265 to view the information on the display.

For portable use, controller 210 of thermoplastic forming tool 200 includes a body having a compartment to hold at least a portion of wand 220. In this embodiment, the body of controller 210 includes a side compartment 280 which includes a space to receive at least tip 230 of the wand. Side compartment 280 may have one or more openings 285 that pass through the side walls of the side compartment. Heat from the tip may pass out of the second compartment through the one or more openings.

Figure 5:
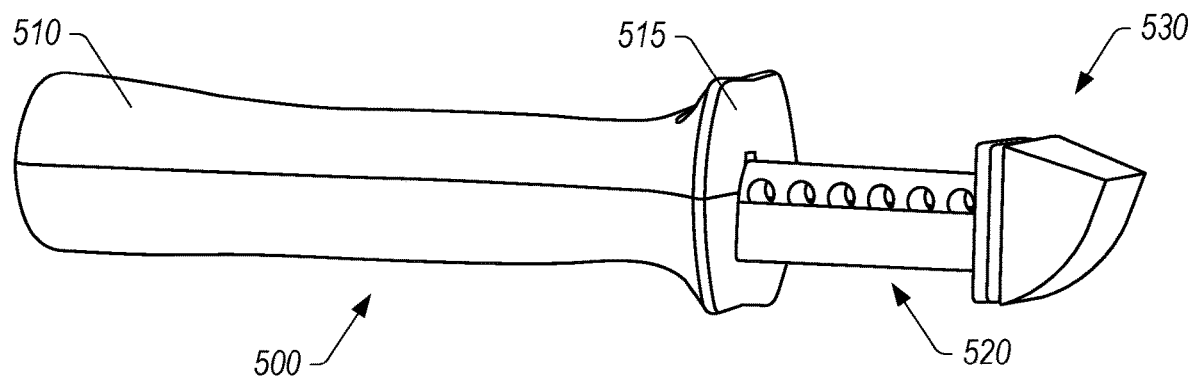
FIG. 5 depicts a projection view of an embodiment of a wand.

FIG. 5 depicts a projection view of an embodiment of a wand. Wand 500 may include three main parts. Handle 510, tip 530, and a conduit 520 connecting the handle to the tip. Handle 510 is configured to be gripped by the user. Electrical cables (not shown) extend up through handle 510 and conduit 520 to tip 530. The electrical cables include power cables and temperature sensor cables. A support 515 is positioned on the handle. Support 515 inhibits tip 530 from contacting a surface when the thermoplastic forming tool is placed on the surface. As depicted in FIG. 5, support 515 may comprise a flange connected to the handle. The support has a sufficient size to inhibit the tip from contacting a surface when the wand is placed on the surface. In one embodiment, the support comprises at least one substantially flat edge which is configured to rest against the surface. The flat edge, in contact with the surface, inhibits rotation of the tool when resting against the surface. Alternate supports are contemplated, including a retractable kick-stand support or a retractable V-support.

Figure 6:
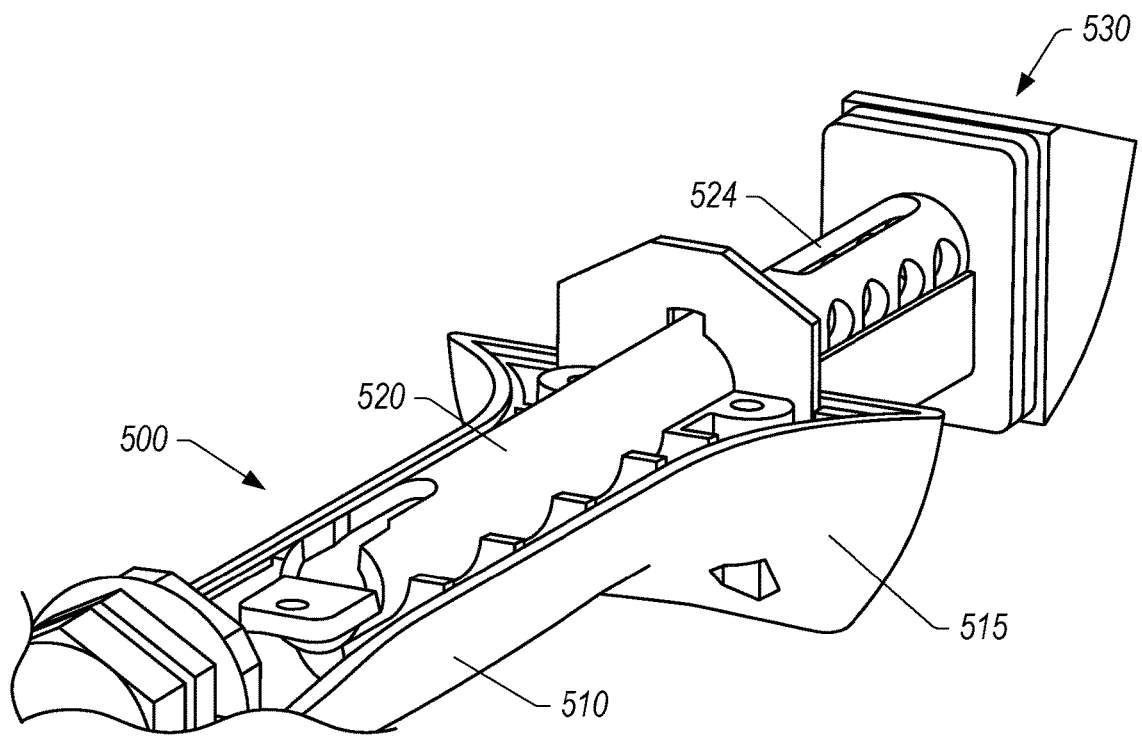
FIG. 6 depicts a lateral cross-sectional view of a wand.

FIG. 6 depicts a lateral cross-sectional view of wand 500. Handle 510 includes a groove, running longitudinally along the interior surface of the handle, to receive and secure conduit 520. In an embodiment, the lower portion of the conduit is disposed in the handle and the upper portion of the conduit extends between the handle and the tip. Cables (not shown) pass under conduit 520 through conduit 527 to tip 530. As shown in this figure, support 515 is formed as an integral part of the handle (e.g., a molded part of the handle). It should be understood, however, that a support may be formed from a separate material that is connected to the handle.

Figure 7:
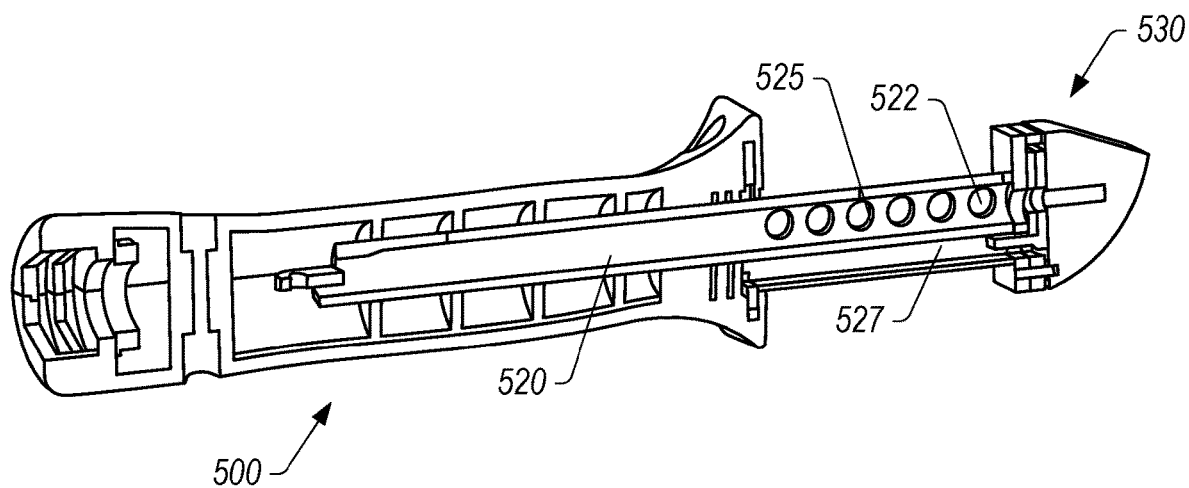
FIG. 7 depicts a vertical cross section view of a wand.

FIG. 7 depicts a vertical cross section view of wand 500. Conduit 520 extends from handle 510 (not shown on FIG. 7) and connects the handle to tip 530. The conduit may include two sections. First section 525 is, in one embodiment, a tube that extends from tip to handle. First section 525 comprises one or more vent openings 522 formed through the tube. The vent openings help release heat from the conduit created when the tip is heated. Second section 527, in one embodiment, is a separate conduit connected to the first section. Second section provides a conduit for the electrical wires that provide power to the tip for heating. The second section is isolated from the first section to reduce the amount of heat transferred to the wires.

Figure 8:
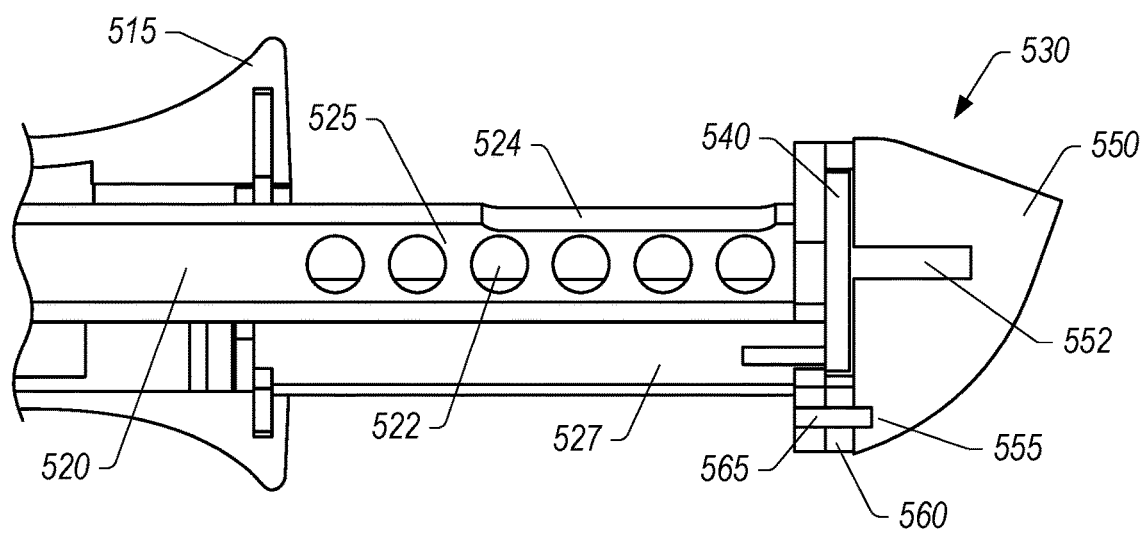
FIG. 8 depicts a close-up cross-sectional view of the tip.

FIG. 8 depicts a close-up cross-sectional view of the tip 530. Tip 530 includes forming shoe 550 and heating element 540. Forming shoe 550 is connected to heating element 540 using a screw (not shown) that passes into a machined opening 552 in the forming shoe. A slot 524 in the conduit allows for adjustment of a screw that passes through the heating element into the forming shoe.

Figure 9:
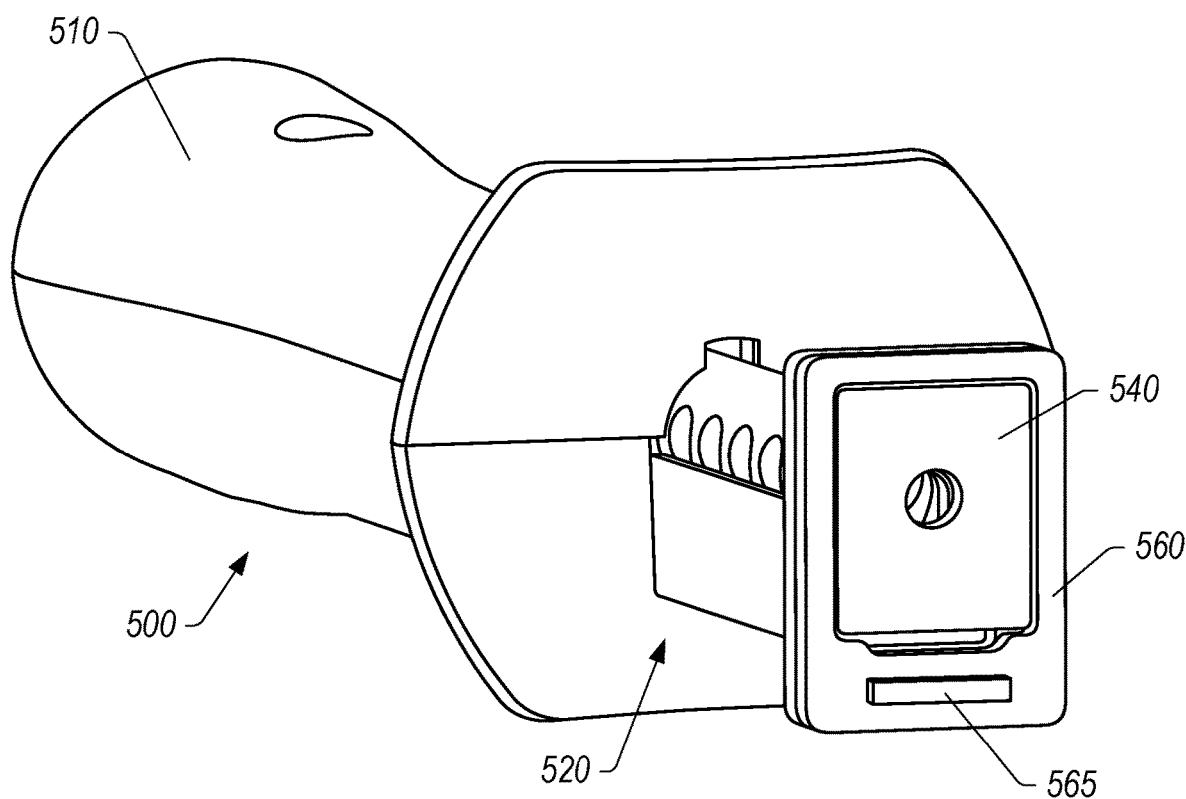
FIG. 9 depicts an end of a wand with the forming shoe removed.

FIG. 9 depicts an end of the wand with the forming shoe removed. The end of the wand includes heating element 540 and forming shoe support 560. During use, forming shoe 550 is attached to forming shoe support 560. Heating element 540 heats the forming shoe when in use, the heat being transferred from the heating element to the forming shoe.

During use, heating element 540 is used to heat forming shoe 550 to a temperature at or above the glass transition temperature of a thermoplastic polymer being used. In some embodiments, the heating element heats the forming shoe to a temperature at or above the melting point of the thermoplastic polymer being used. After the forming shoe reaches the desired temperature, the forming shoe is placed in contact with the thermoplastic material. Through heat and pressure from the user, the forming shoe is used to soften or melt the thermoplastic material as needed. During use of the wand to alter the thermoplastic material, substantial pressure is used by the user, which can cause the forming shoe to rotate about the end of the tip. To ensure that the forming shoe does not rotate about the end of the wand, an alignment feature and an alignment opening are used to inhibit rotation. Referring to FIG. 9, forming shoe support 560 includes an alignment feature (e.g., a rectangular protrusion) 565. Forming shoe 550, depicted in FIG. 10A, includes an alignment opening (e.g., a slot) 555 which is complementary in shape and size to the alignment feature on the forming shoe support. Referring to FIG. 10B, when forming shoe 550 is connected to forming shoe support 560, the alignment feature 565 mates with the alignment opening 555 such that the rotation of the forming shoe about the forming shoe support is inhibited. While this particular embodiment includes a protruding alignment feature on the forming shoe support, and a complementary opening on the forming shoe, these can be reversed. For example, a protruding alignment feature may be formed on the forming shoe, and the alignment opening may be formed on the forming shoe support.

Figure 10A:
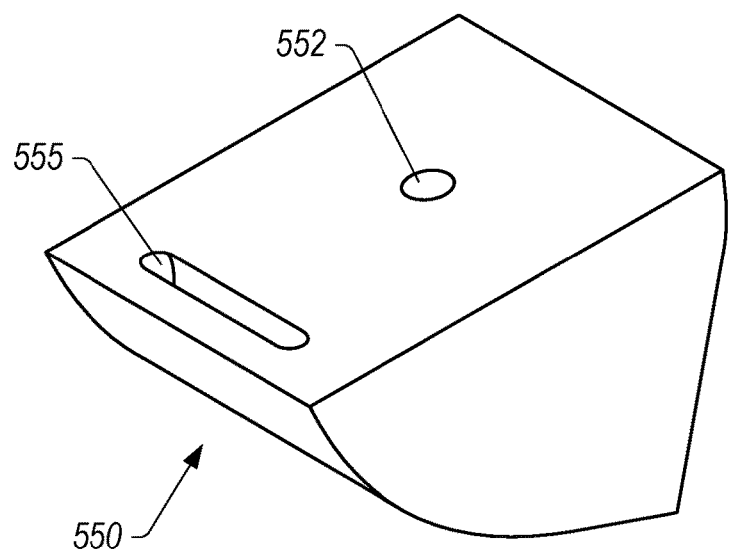
FIG. 10A depicts a projection view of a forming shoe.
Figure 10B:
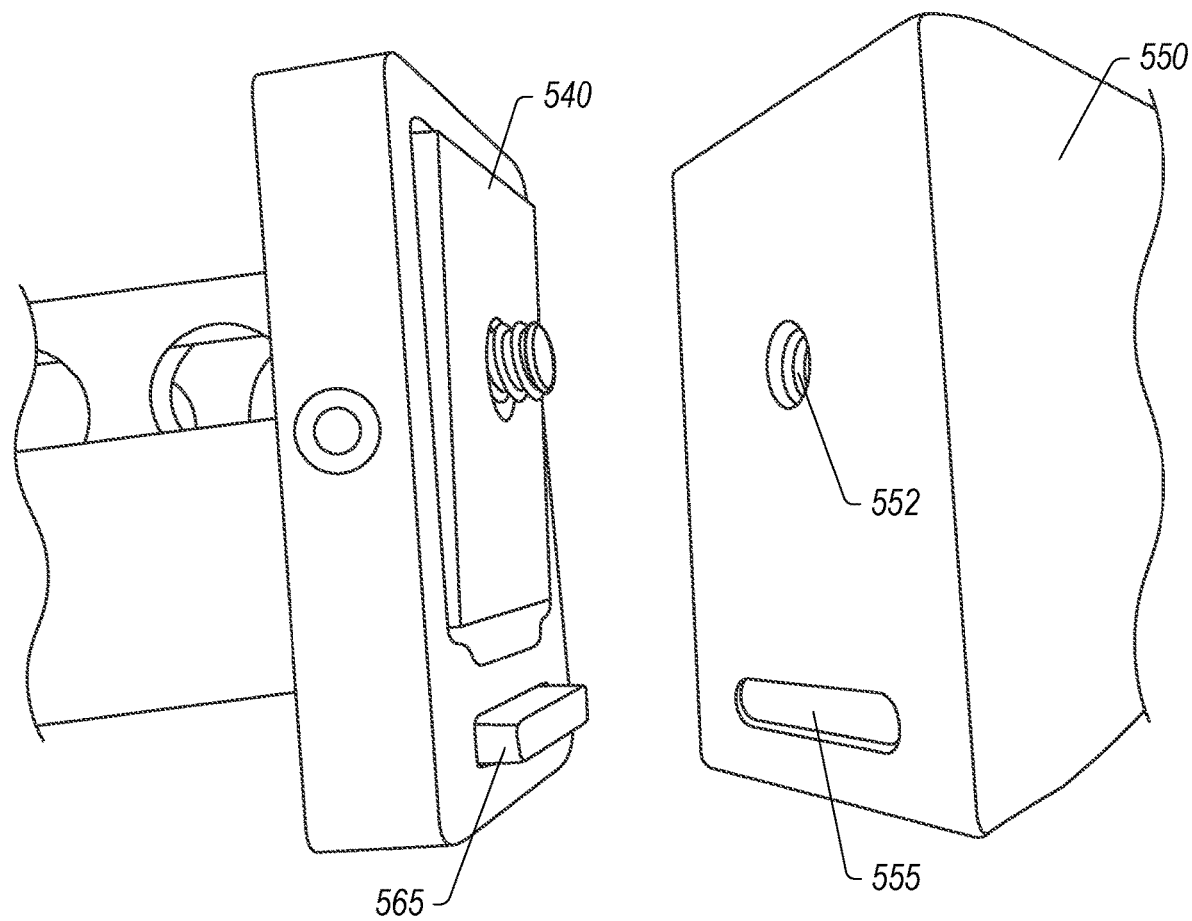
FIG. 10B depicts a projection view of a forming shoe detached from a wand.

Referring to FIG. 10A, the forming shoe is depicted as a rounded block having sharp edges. It should be understood, however, that the forming shoe can have any shape suitable for the type of forming being done, and the shape of the forming shoe is not limiting to the invention. As discussed previously, forming shoe is connected to heating element through a screw that passes through the heating element into the forming shoe. Forming shoe 550 includes a machined opening 552 having threads that are complementary to the screw being used to connect the forming shoe to the heating element. To attach forming shoe 550 to the tip of the heating wand a screw is passed through heating element 540. An opening extending through the heating element is accessed through slot 524 formed in the conduit. Once the screw is passed through the heating element, the end of the screw is aligned with opening 552 in forming shoe 550 and the screw advanced into the opening, pulling the forming shoe into contact with the heating element.

Figure 11:
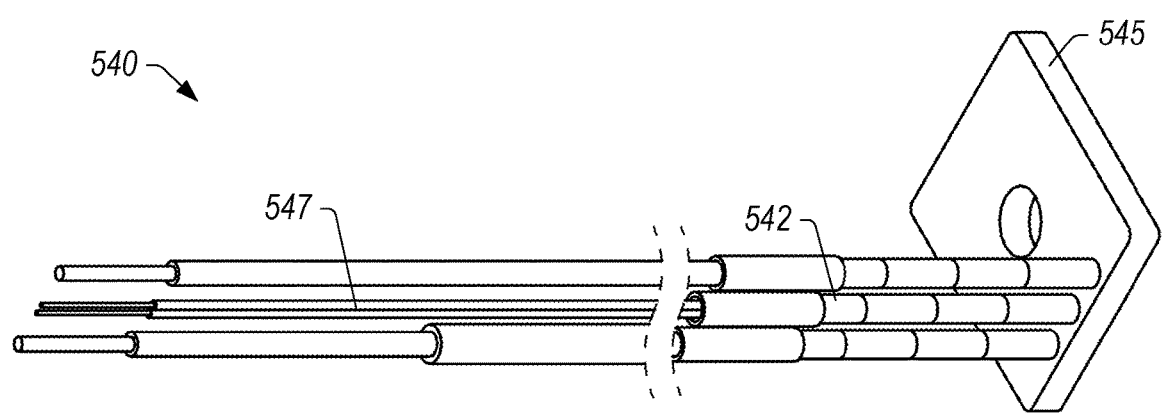
FIG. 11 depicts an embodiment of heating element.

FIG. 11 depicts an embodiment of heating element 540. Heating element 540 includes a heat plate 545 and cables 547 coupled to the heat plate. The heat plate may be formed from any material suitable for heating. In a preferred embodiment, heat plate 545 is a ceramic heat plate (e.g., an aluminum nitride heat plate). One or more temperature sensors may be disposed within, or coupled to the heat plate. Cables may include multiple wires bundled together within an outer insulating sleeve. Cables 547 include power supply wires and temperature sensing wires. In one embodiment, three cables are attached to the heat plate: a power supply cable, a first temperature sensor cable, and a second temperature sensor cable. More or less cables may be present. The cables are passed through the conduit 520, specifically through second section 527 of conduit 520. To protect the cables from the heat of the heat plate, the cables may be covered with an insulating sleeve 542. The insulating sleeve may be formed from any suitable insulating material (e.g., polytetrafluoroethylene).

Figure 13A:
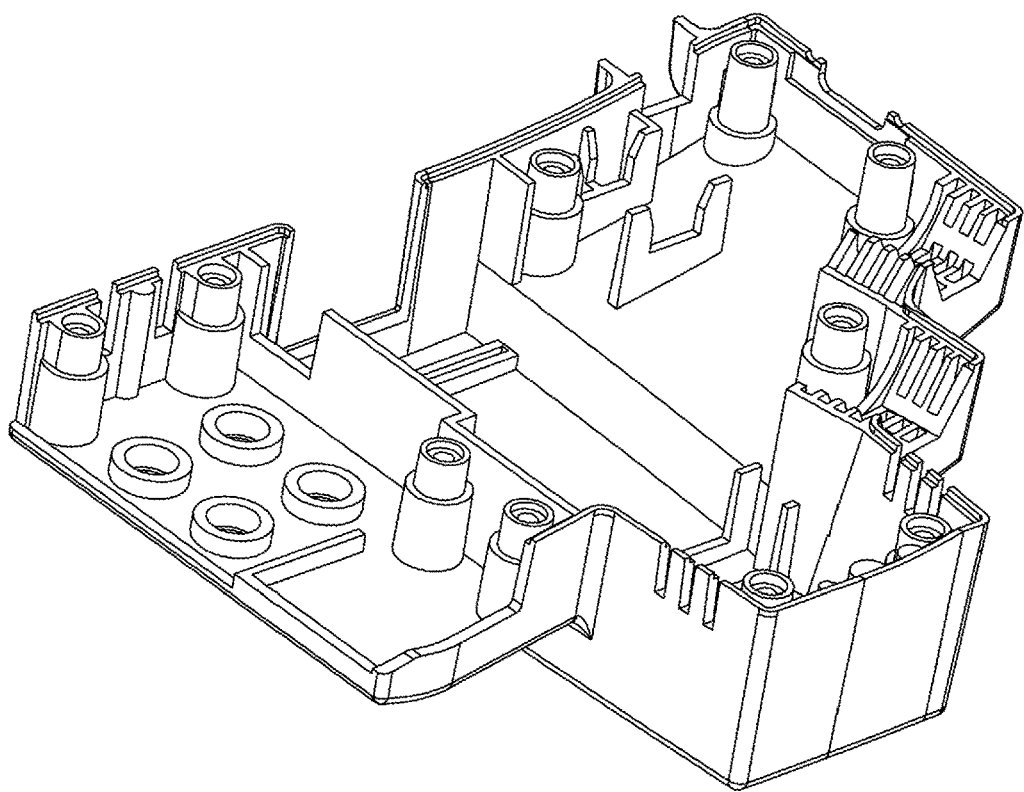
FIG. 13A depicts an interior view of the front piece of the controller body.
Figure 13B:
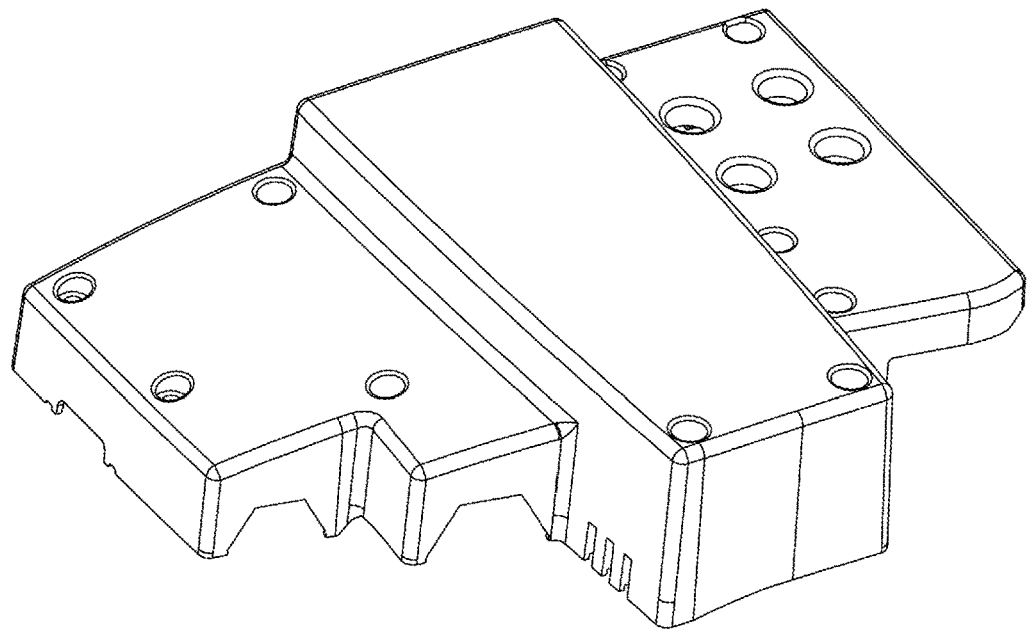
FIG. 13B depicts an exterior view of the front of the controller body.
Figure 14A:
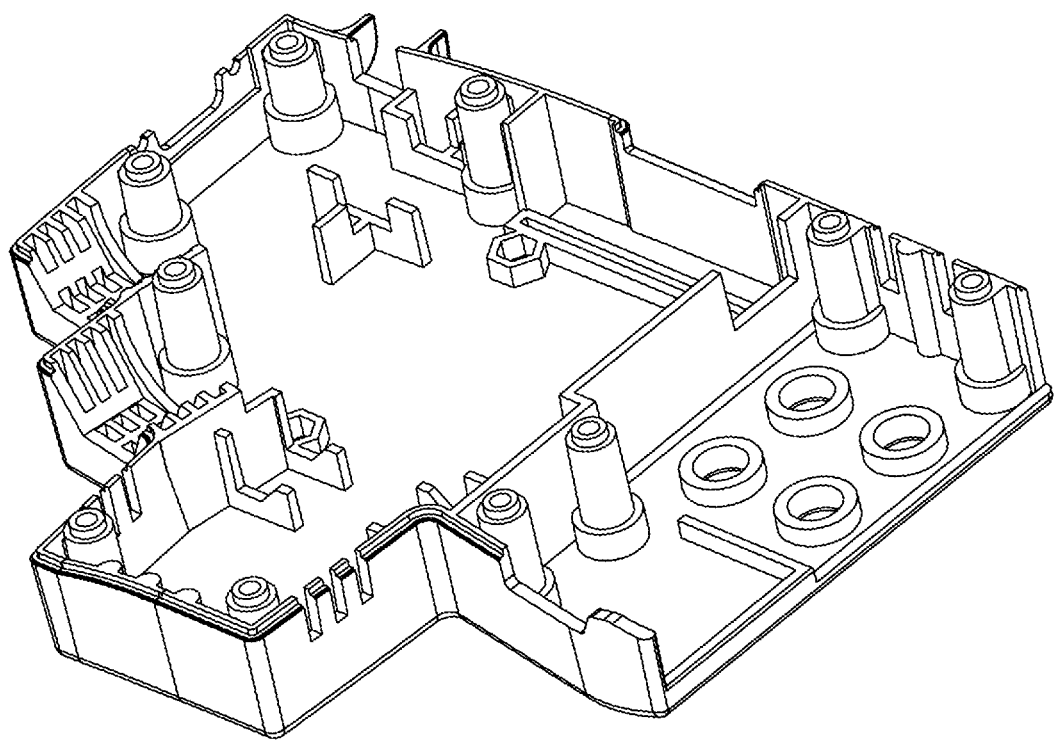
FIG. 14A depicts an interior view of the back piece of the controller body.
Figure 14B:
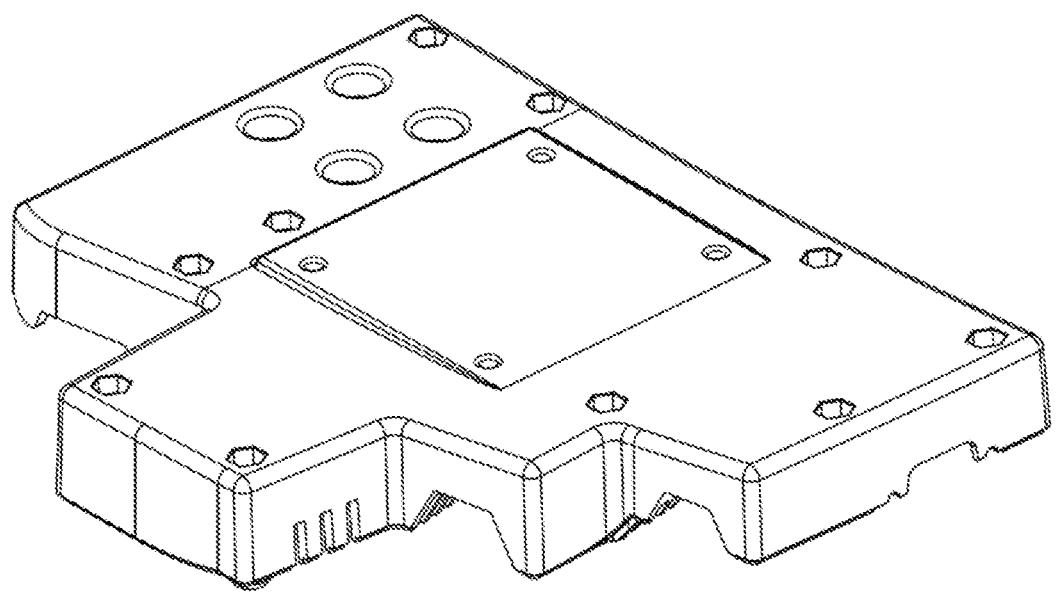
FIG. 14B depicts an exterior view of the back piece of the controller body.

The other component of the thermoplastic forming tool is the controller. The controller is composed of a body, a processor disposed in the body and a wand storage compartment. In one embodiment, the controller body is formed from two molded pieces (front and back) that are joined together. FIG. 13A depicts an interior view of the front piece of the controller body. FIG. 13B depicts an exterior view of the front of the controller body. FIG. 14A depicts an interior view of the back piece of the controller body. FIG. 14B depicts an exterior view of the back piece of the controller body.

Figure 15A:
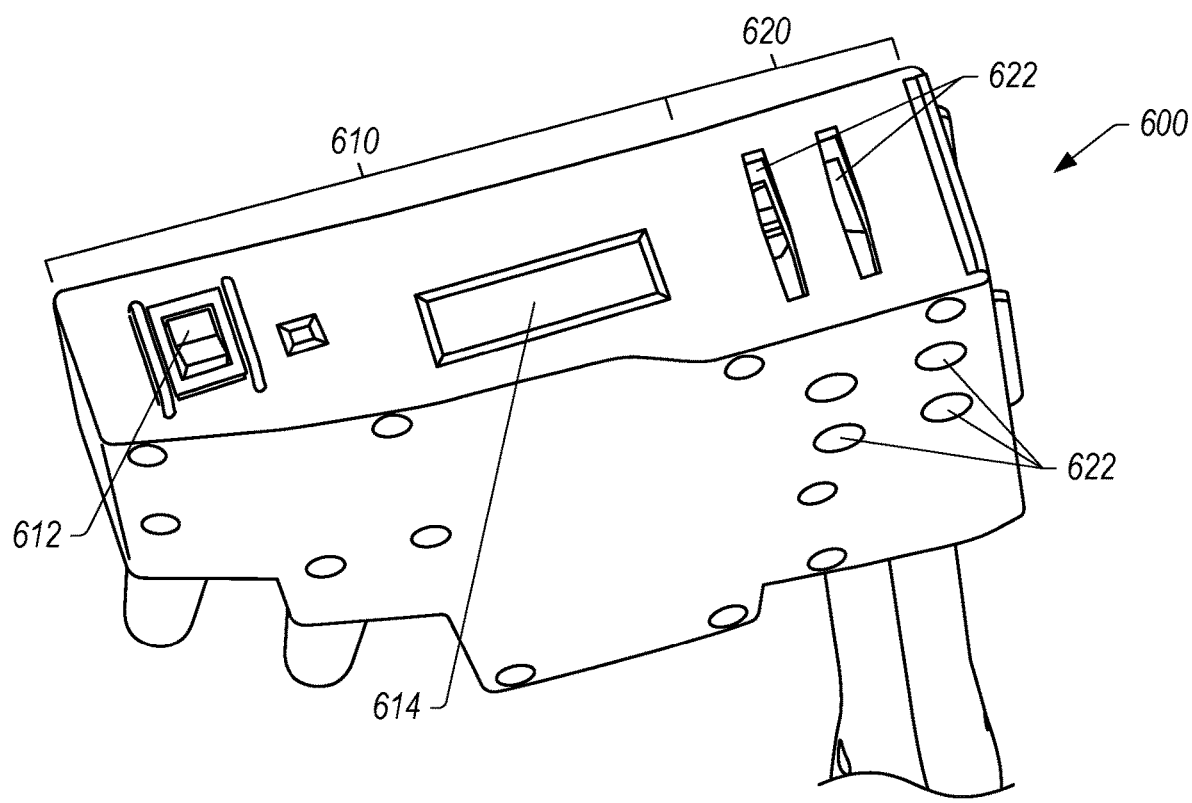
FIG. 15A depicts a top view of the assembled controller.
Figure 15B:
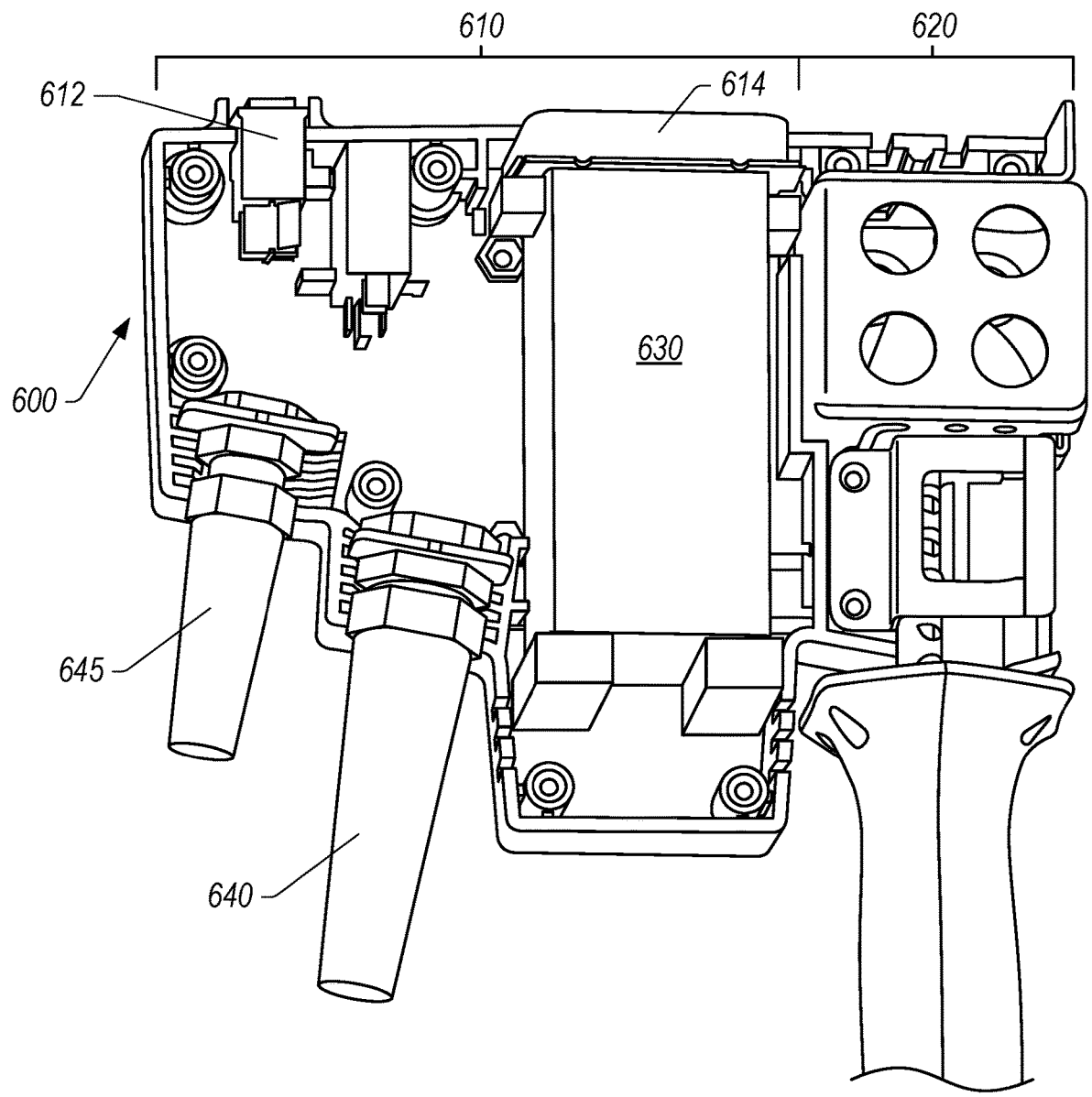
FIG. 15B depicts an electrical component layout of the interior of the controller body.

FIG. 15A depicts a top view of the assembled controller. FIG. 15B depicts a schematic diagram of the interior of the controller body 600. Controller body 600 may be separated into two compartments. First compartment 610 includes the electronic components for the thermoplastic forming tool. Second compartment 620 is used as a storage area for the wand. Referring to FIG. 15A, disposed on the top of the controller are a power button 612 and a display 614. The power button, in a preferred embodiment, will simply turn the thermoplastic forming tool on or off. The display 614 will provide information regarding the temperature of the tip of the wand. In one embodiment, as shown in FIG. 3, the display may provide the current temperature of the tip of the wand, and the preset temperature of the tip of the wand. Other information concerning the operating status of the thermoplastic forming tool may also be presented on the display. In FIG. 15A, vent openings 622 can be seen on the top face and side of second compartment 620. Heated air, produced by placing a heated wand tip in the second compartment is released through the vent openings.

FIG. 15B shows the interior of the controller, divided into two compartments. First compartment 610 includes an electronic controller 630. The electronic controller is coupled to the external power source through the power cable. A power cable inlet 645 is formed in the body 600. The power cable inlet 645 is, in some embodiments, a polymeric cable support which inhibits the cable from being bent or twisted. Controller 630 is also coupled to the heating element through the heating element cables. Heating element cable inlet 640 may also include a polymeric cable support. In an embodiment, the external power cable and the heating element bundled cable is passed through the respective power cable inlets 645 and 640 and electrically coupled to controller 630 and power switch 612. Display 614 is disposed on a top surface of the body, as shown in FIG. 3.

Figure 12:
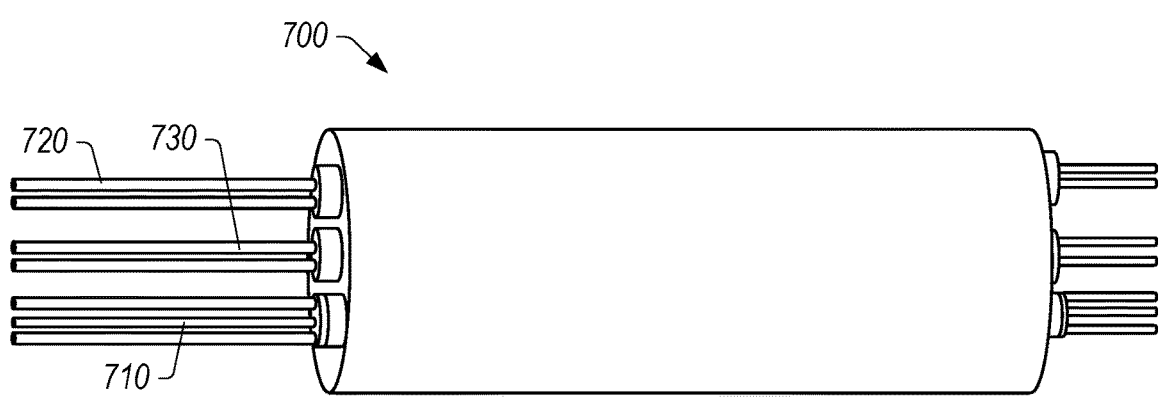
FIG. 12 depicts a bundled cable.

In an embodiment, all the cables from the heating element may be bundled into a single cable to protect the cables. FIG. 12 depicts a bundled cable 700 that includes all the heating element cables: the heating element power cable 710, the primary temperature sensor cable 720, and the secondary temperature sensor cable 730. These individual cables may be embedded in insulation to form a bundled cable, as shown in FIG. 12. The insulation used to bundle the cables may be SJO rated insulation. In an embodiment, the external power cable and the heating element bundled cable is passed through the respective power cable inlets (640 and 645) and electrically coupled to controller 630 and power switch 612.

Figure 16:
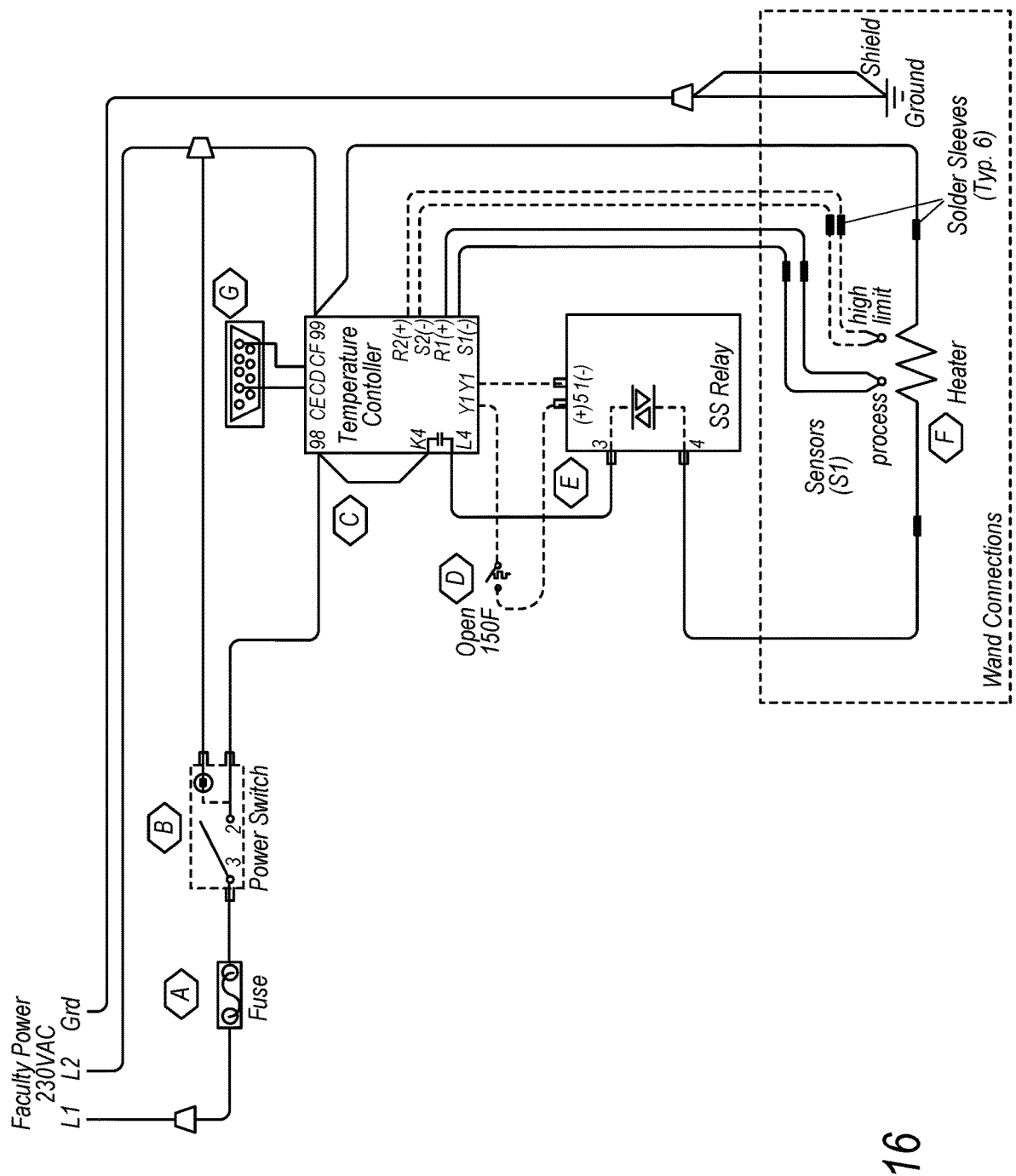
FIG. 16 depicts a schematic diagram of the electrical system for the thermoplastic forming tool.

FIG. 16 depicts a schematic diagram of the electrical system for the thermoplastic forming tool. Operation of the thermoplastic forming tool is controlled by an embedded microprocessor based PID temperature controller which maintains a predetermined temperature (based on the preset temperature). An exemplary temperature controller is the Watlow PM6C1CA-BLAJPWN controller. An external power supply (e.g., a facility 230VAC) is electrically coupled to the temperature controller (C) and the power switch (B). When the power switch is turned on, power flows to the temperature controller and is passed on to the heating element (F).

Prior to use, the temperature controller is programmed to heat the heating element to a preset temperature. For use in deforming or melting thermoplastic materials, the preset temperature is typically set at 400° F. or greater. The temperature controller includes a data port (G) which can be used to couple the temperature controller to a computer. In a preferred embodiment, the preset temperature can only be adjusted by connecting the temperature controller to computer having software that allows a user to adjust the preset temperature. This prevents the user from inadvertently altering the preset temperature while using the thermoplastic forming tool. In addition, controller 630 employs Bluetooth communications allowing the controller to be programmed utilizing wireless technology.

After the device is powered on, the temperature controller determines the temperature of the heating element using the primary temperature sensor (S1). If the temperature of the heating element is below the preset temperature, the temperature controller sends a control signal to relay (E) which opens the switch sending power to the heating element (F). Using a feedback loop, the temperature controller continues to monitor the temperature of the heating element, through the primary temperature sensor, and provide electrical current to the heating element, until the heating element reaches the preset temperature. Once the preset temperature is reached, the electrical current is discontinued by sending a control signal to the relay to place the switch in the off position. When the temperature of the heating element drops by a predetermined amount (e.g., 2° F., 4° F., 6° F., 8° F., 10° F., 15° F., 20° F., or 30° F.), the temperature controller will reinstate the electrical current to bring the heating element back to the preset temperature.

The temperature controller also includes a HI-Limit control algorithm. The purpose of the HI-Limit control algorithm is to prevent the heating element from being heated over the preset temperature. After repeated use, a condition may develop in the electrical circuitry that may cause the heating element to be heated without the temperature controller knowing that there is a defect. For example, if the primary temperature sensor is damaged, the temperature controller may not receive an accurate temperature of the heating element. The temperature controller may continue to send an electric current to the heating element in an attempt to raise the temperature of the heating element. This can lead to overheating of the heating element which can create a dangerous situation for the user and the tool. To prevent this kind of overheating, a secondary temperature sensor (S2) is connected to the heating element. When the heating element is being heated to the preset temperature, the temperature controller monitors both the primary temperature sensor and the secondary temperature sensor. In one embodiment, if the temperature of the heating element, as measured by the secondary temperature sensor, exceeds a preset temperature limit, the temperature controller discontinues the provided electrical current (e.g., by sending a control signal to the relay). The preset temperature limit is typically set at a temperature that is substantially greater than the preset temperature (e.g., 20° F., 30° F., 50° F., or 100° F. greater than the preset temperature).

In the event the temperature limit is exceeded, the temperature controller will activate a fail-safe shutdown sequence which deactivates (turns off) the power to the heater. Once the Hi-Limit algorithm has been activated, the device cannot be powered back on without human intervention in order to reset the controller. Thus, the temperature controller will not automatically resume normal control function, even if the temperature decreases below the preset temperature limit. In an embodiment, the temperature controller may only be reset after replacement of the heating element and the associate temperature sensors.

Figure 17B:
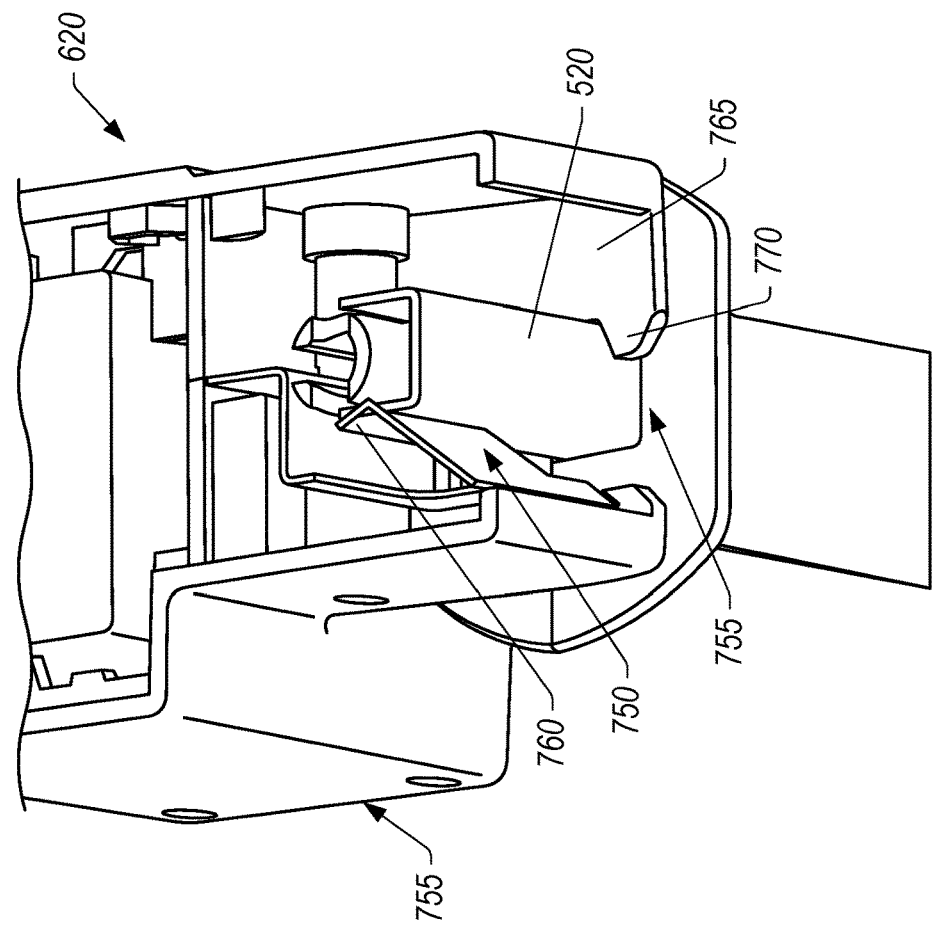
FIG. 17B depicts a cross sectional view of the second compartment with a wand residing therein.
Figure 17A:
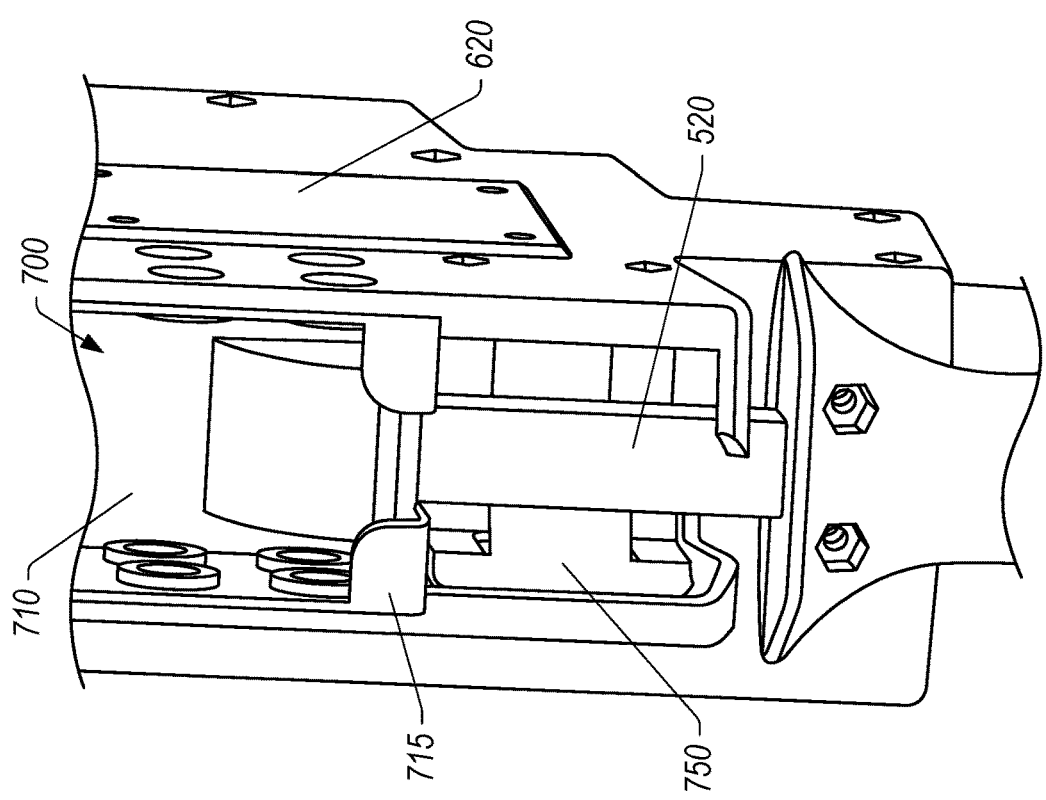
FIG. 17A depicts a side view of the controller, showing the wand residing in the second compartment.

For portable use, the wand may be stored in second compartment 620 of the body of the controller. A side view of the controller, showing the wand residing in the second compartment, is shown in FIG. 17A. FIG. 17B depicts a cross sectional view of the second compartment with a wand residing therein. In one embodiment, second compartment 620 is configured to hold at least a portion of the wand during use. As shown in FIG. 17A, the second compartment may include a tip support 700 and a wand retention bracket 750. Tip support 700 includes a notched tray 710 that is shaped to allow the tip of the wand to be lowered into the tray. Notched tray includes a planar platform having tabs 715 attached to the platform. During use, the tip of the wand is passed into the top portion of the tip support and lowered into the notched tray. The tabs of the notched tray help secure the wand in the tray.

The second compartment also includes a wand retention bracket 750. Referring to FIG. 17B, the wand retention bracket includes a slot 755 sized to receive the conduit 520. The wand retention bracket may also include an elastic plate 760 which "locks" the wand into the wand retention bracket. In the present embodiment, during storage of the wand in the second compartment, the tip of the wand is placed into the tip support and the conduit is placed into the wand retention bracket through slot 755. As the conduit 520 moves into the wand retention bracket, elastic plate 760 is deflected and provides a force against the conduit, forcing the conduit against retention wall 765. Retention wall 765 includes a tab 770 which partially surrounds the conduit, securing the conduit in the wand retention bracket.

To remove the wand from the second compartment, the wand is lifted above the tabs 715 of the notched tray. The conduit 520 is then pushed against the elastic plate 760 and pulled out of wand retention bracket 750 through slot 755.

When the heated tip of the wand is placed in the second compartment, the tip will begin heating the second compartment. As discussed previously, vent holes are formed in the sidewalls and the top of the second compartment to allow heat to escape from the second compartment. Preferably, the tip of the wand will remain heated to the preset temperature to allow rapid use of the wand when removed from the second compartment. Keeping the tip of the heated wand at temperatures of 400° F. or higher may lead to inadvertent heating of the first compartment and the electronic shoes disposed therein. To prevent the electronic shoes in the first compartment from being damaged, a temperature sensor is disposed inside the first compartment to monitor the interior temperature of the first compartment. In one embodiment, a printed circuit board (PCB) thermostat may be used to monitor the temperature of the electronic shoes in the first compartment. Referring to FIG. 16, a PCB thermostat (D) is placed in the control circuit between the temperature controller and the relay. During normal operation, the PCB thermostat is in a closed position (i.e., is a "normally closed" thermostat), allowing the control signals from the temperature controller to reach the relay. When the temperature inside the first compartment reaches a predetermined compartment high temperature (e.g., 150° F.) the thermostat changes to an open position, breaking the control signal connection between the temperature controller and the relay. The thermostat will remain in the open position until the temperature drops below the predetermined compartment low temperature, (typically between about 5-30° F. below the compartment high temperature). When the thermostat drops below the predetermined compartment low temperature the thermostat reverts back to the closed position. This allows the temperature of the first compartment to be regulated, inhibiting damage to the electronic shoes due to excessive heating of the first compartment.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A thermoplastic forming tool comprising:
   a wand comprising:
     a handle,
     a tip, and
     a conduit coupling the handle to the tip,
     wherein the tip includes:
       a forming shoe support coupled to the conduit,
       a heating element positioned in the forming shoe support, the heating element being configured to generate heat, and
       a forming shoe connected to the heating element such that, during use, heat from the heating element transfers to the forming shoe and heats the forming shoe to a temperature at or above the glass transition temperature of a thermoplastic polymer;
   a controller comprising a body, wherein the body of the controller comprises a first compartment and a second compartment, wherein the first compartment comprises a processor, and wherein the second compartment is configured to hold at least a portion of the wand during use;
   wherein the processor is operable to execute program instructions, and wherein the program instructions are operable to:
     determine the temperature of the heating element; and
     adjust an electrical current provided from a power source to the heating element to adjust the temperature of the heating element.

2. The tool of claim 1, wherein the body of the controller comprises a coupling element that allows the controller to be coupled to an article of clothing or a belt of a user of the thermoplastic forming tool.

3. The tool of claim 1, wherein the forming shoe support comprises an alignment feature that has a shape and size that is complementary to an alignment opening of the forming shoe, or wherein the forming shoe support comprises an alignment opening that has a shape and size that is complementary to an alignment feature of the forming shoe, and wherein when the forming shoe is connected to the forming shoe support, the alignment feature mates with the alignment opening such that the rotation of the forming shoe about the forming shoe support is inhibited.

4. The tool of claim 1, wherein the conduit comprises one or more vent openings formed through the conduit.

5. The tool of claim 1, wherein the forming shoe is a rounded block having a width greater than the conduit.

6. The tool of claim 1, wherein the second compartment comprises a tip support and a wand retention bracket, wherein the tip of the wand is placed on the tip support and the conduit is placed on the wand retention bracket during use.

7. The tool of claim 6, wherein the wand retention bracket comprises a slot sized to receive the conduit, wherein, during use, the conduit resides in the slot when the tip is placed on the tip support.

8. The tool of claim 7, wherein the wand retention bracket comprises an elastic plate that forces the conduit against a retention wall.

9. The tool of claim 1, wherein first compartment is sealed and the second compartment is open.

10. The tool of claim 1, wherein the second compartment comprises one or more vent openings.

11. The tool of claim 1, wherein the controller is set to a preset temperature, and wherein the controller provides sufficient electrical current to the heating element to heat the heating element to the preset temperature, wherein the preset temperature is a temperature of 400° F. or greater.

12. The tool of claim 1, wherein the preset temperature is set by coupling the controller to a computer or handheld device having software that allows a user to adjust the preset temperature.

13. A thermoplastic forming tool comprising:
    a wand comprising:
      a handle,
      a tip, and
      a conduit coupling the handle to the tip,
      wherein the tip includes:
        a forming shoe support coupled to the conduit,
        a heating element positioned in the forming shoe support, the heating element being configured to generate heat, and
        a forming shoe connected to the heating element such that, during use, heat from the heating element transfers to the forming shoe and heats the forming shoe to a temperature at or above the glass transition temperature of a thermoplastic polymer;

a controller comprising a body, wherein the body of the controller comprises a first compartment and a second compartment, wherein the first compartment comprises a processor, and wherein the second compartment is configured to hold at least a portion of the wand during use, and wherein the first compartment comprises a thermostat coupled to the processor;

wherein the processor is operable to execute program instructions, and wherein the program instructions are operable to:

determine the temperature of the heating element; and adjust an electrical current provided from a power source to the heating element to adjust the temperature of the heating element;

wherein the thermostat measures the temperature inside the first compartment and disconnects the supply of electrical current to the heating element when the temperature inside the first compartment is above a predetermined compartment high temperature.

14. The tool of claim 13, wherein the thermostat is further operable to restart the electrical current provided to the heating element when the temperature inside the first compartment drops below a predetermined compartment low temperature.

15. The tool of claim 14, wherein the thermostat is further operable to restart the electrical current provided to the heating element when the wand is in the second compartment and the temperature in the first compartment is below the predetermined compartment low temperature.

16. The tool of claim 1, further comprising a screw coupling the forming shoe to the heating element, wherein the screw is positioned inside an opening in the forming shoe having threads complementary to threads of the screw.

17. The tool of claim 1, further comprising one or more cables coupled to the heating element and positioned in the conduit.

18. The tool of claim 17, wherein at least one of the cables is positioned inside the conduit and routed to the controller through the handle.

* * * * *

UNITED STATES PATENT AND TRADEMARK OFFICE
CERTIFICATE OF CORRECTION

PATENT NO. : 11,518,115 B2
APPLICATION NO. : 17/037147
DATED : December 6, 2022
INVENTOR(S) : Charlie Falconer It is certified that error appears in the above-identified patent and that said Letters Patent is hereby corrected as shown below:

In the Claims

Claim 1, Column 11, Line 59, please add -- with a surface of the forming shoe in contact with a surface of the heating element -- after "element" and before "such that,"

Claim 13, Column 12, Line 65, please add -- with a surface of the forming shoe in contact with a surface of the heating element -- after "element" and before "such that,"

Signed and Sealed this
Twenty-fifth Day of April, 2023

*Katherine Kelly Vidal*

Katherine Kelly Vidal
*Director of the United States Patent and Trademark Office*